(12) United States Patent
Good et al.

(10) Patent No.: US 9,018,799 B2
(45) Date of Patent: Apr. 28, 2015

(54) ELECTRICAL POWER SUPPLY SYSTEM HAVING INTERNAL FAULT PROTECTION

(75) Inventors: Jef William Good, German Valley, IN (US); Robert L. Seagren, Rockford, IL (US); Joshua Berg, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 547 days.

(21) Appl. No.: 13/479,312

(22) Filed: May 24, 2012

(65) Prior Publication Data

US 2013/0313901 A1 Nov. 28, 2013

(51) Int. Cl.
| | |
|---|---|
| H02H 3/30 | (2006.01) |
| H02J 3/14 | (2006.01) |
| H02H 7/22 | (2006.01) |
| H02J 1/10 | (2006.01) |

(52) U.S. Cl.
CPC *H02H 3/305* (2013.01); *H02J 3/14* (2013.01); *Y02B 70/3225* (2013.01); *Y04S 20/222* (2013.01); *H02H 7/22* (2013.01)

(58) Field of Classification Search
USPC .......................................................... 307/43
See application file for complete search history.

(56) References Cited

U.S. PATENT DOCUMENTS

| | | | |
|---|---|---|---|
| 695,363 | A | 3/1902 | Armstrong et al. |
| 2,832,896 | A | 4/1958 | Stineman et al. |
| 2,974,257 | A | 3/1961 | Flugstad |
| 3,617,812 | A | 11/1971 | Deter |
| 4,068,275 | A | 1/1978 | Teel et al. |
| 4,321,645 | A | 3/1982 | Thom et al. |
| 6,037,752 | A | 3/2000 | Glennon |
| 6,396,279 | B1 | 5/2002 | Gruenert |
| 6,806,589 | B1 | 10/2004 | Suttie |
| 6,845,630 | B2 | 1/2005 | Bruno et al. |
| 7,131,275 | B2 | 11/2006 | Gustafson |
| 7,375,499 | B2 | 5/2008 | Maddali et al. |
| 7,457,090 | B2 | 11/2008 | Randazzo |
| 7,609,492 | B2 | 10/2009 | Maier |
| 7,746,024 | B2 | 6/2010 | Rozman et al. |
| 7,826,188 | B2 | 11/2010 | Gauthier, Jr. et al. |
| 7,876,542 | B2 | 1/2011 | Rozman et al. |
| 8,102,634 | B2 | 1/2012 | Gajic et al. |
| 8,130,479 | B2 | 3/2012 | Maier |

*Primary Examiner* — Robert Deberadinis
(74) *Attorney, Agent, or Firm* — Carlson, Gaskey & Olds, PC

(57) ABSTRACT

An electrical system architecture has at least two sources of electrical power, each delivering power to an individual AC bus. The individual AC buses are connected by a tie bus. A first source of electric power delivers power into a first AC bus, and the first AC bus delivers power to a first set of users. A supply current sensor is between the first source of power and the first AC bus. A tie bus output sensor senses output power from the AC bus being delivered onto the tie bus. A plurality of user output current sensors sense current passing to each of the plurality of users. A control is operable to compare a sensed current in the supply current sensor, and sum the current in the tie bus output sensor, and the plurality of user output sensors. If the sum of the output sensors differs by more than a predetermined amount from the current sensed by the supply sensor, the control identifies a fault. The first AC bus is then disconnected from the tie bus.

18 Claims, 4 Drawing Sheets

ELECTRICAL POWER SUPPLY SYSTEM HAVING INTERNAL FAULT PROTECTION

BACKGROUND OF THE INVENTION

This application relates to an electrical system architecture having a plurality of sources of electrical power.

Electrical system architectures are becoming increasingly complex, and must communicate (i.e., distribute) power in any number of directions. One example of a complex electrical system architecture would be an architecture associated with an aircraft. The system receives electrical input power from gas turbine engines driving generators. There may be typically three generators associated with an aircraft, although more may also be utilized.

Each of two main gas turbine engines have their generators delivering power into separate AC buses. Any number of users receive power from those AC buses.

In addition, a tie bus would typically connect the two AC buses such that power can flow from either of the two AC buses to the other.

Challenges may arise if a fault occurs on either of the AC buses due to the interconnection.

SUMMARY OF THE INVENTION

An electrical system architecture has at least two sources of electrical power, each delivering power to an individual AC bus. The individual AC buses are connected by a tie bus. A first source of electric power delivers power into a first AC bus, and the first AC bus delivers power to a first set of users. A supply current sensor is between the first source of power and the first AC bus. A tie bus output sensor senses output power from the AC bus being delivered onto the tie bus. A plurality of user output current sensors sense current passing to each of the plurality of users. A control is operable to compare a sensed current in the supply current sensor, and sum the current in the tie bus output sensor, and the plurality of user output sensors. If the sum of the output sensors differs by more than a predetermined amount from the current sensed by the supply sensor, the control identifies a fault. The first AC bus is then disconnected from the tie bus.

These and other features of this application will be best understood from the following specification and drawings, the following of which is a brief description.

DETAILED DESCRIPTION

Figure 1:
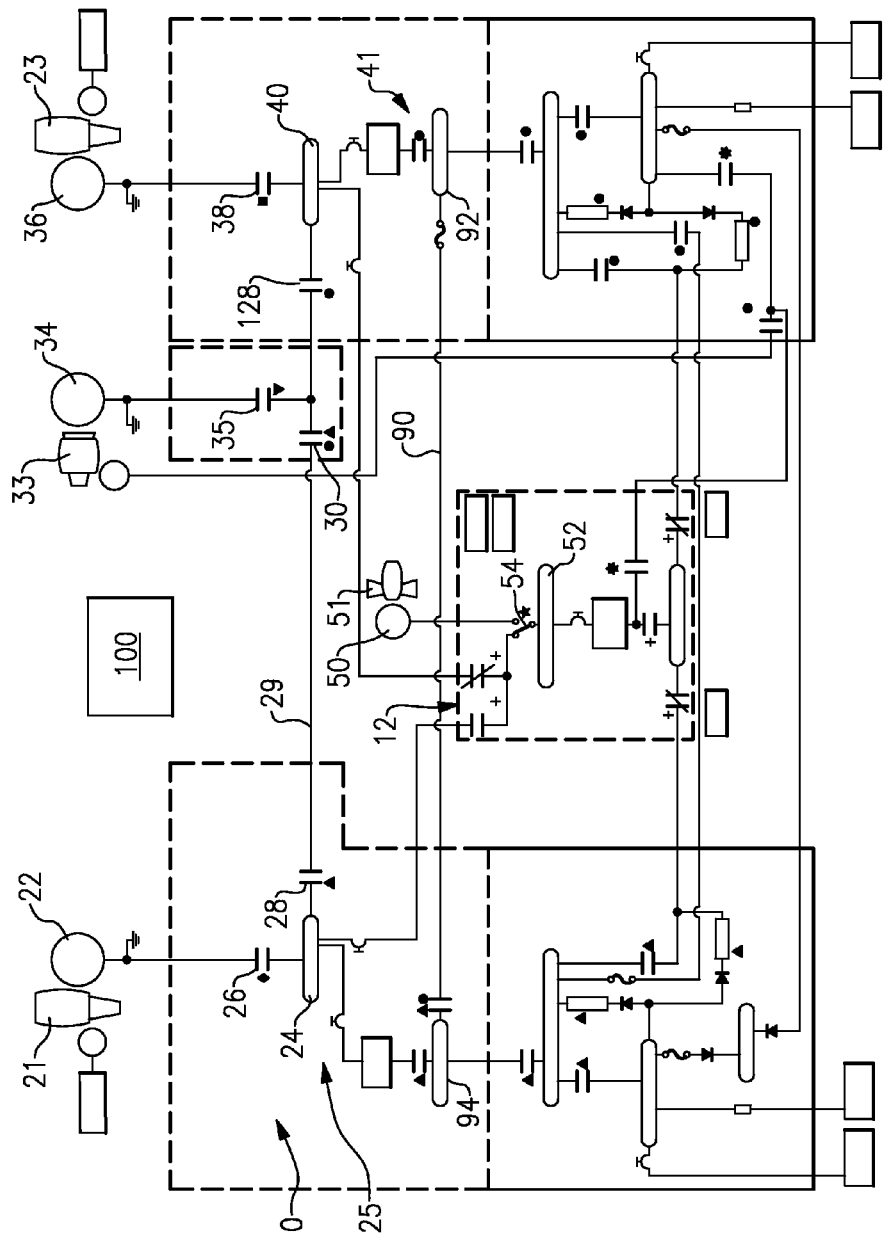
FIG. 1 shows an electric system architecture as may be associated with an aircraft.

An electric system architecture 20, as may be associated with an aircraft, is illustrated in FIG. 1. A first generator 22 may be a variable frequency generator, and may be driven such as by an aircraft gas turbine engine 21. The generator 22 delivers power to a first AC bus 24. The power passing to the first AC bus 24 passes through a component 26 that includes both a switch and a current sense transformer. For purposes of this application, the generator 22, its bus 24, component 26, another component combining a switch and current sensor 28, and a number of users shown generally at 25, will all be known as a first engine sub-architecture.

The AC bus 24 further delivers power into a tie bus 29 through component 28 that includes both a current sensor and a switch.

At the opposed end of the tie bus 29 is another component 30 that includes both a current sensor and a switch.

An auxiliary power unit (APU) 33, which includes another gas turbine engine driven generator 34, delivers power through a component 35 that includes a current sensor and switch. Further along on the tie bus 29 is another component 128 that provides a switch and yet another current sensor.

Another variable frequency generator 36 is powered by an engine 23, and provides power to an AC bus 40 through yet another component 38 that includes a current sensor and switch.

The AC bus 40, the component 38, the component 128 and the generator 36 can all be thought of as a second sub-architecture associated with the second generator 36. The AC bus 40 powers a number of users shown schematically at 41.

Element 50 illustrates yet another generator which may be driven such as by a ram air turbine 51. As known, the generator 50 and the ram air turbine 51 may be utilized when there is a fault on the engines to provide electrical power for a period of time. A switch 54 allows the generator 50 to be connected or disconnected from an AC bus 52, which powers a number of components that are seen as "essential."

While this application describes each of the "components" as including both a current sensor and a switch, in fact, the two may be entirely separate. For purposes of describing the schematic, they are described as a combination, however, they need not be packaged as such to come within the scope of this application.

In addition, the components between the buses and the generators are said to include "supply" sensors, and all of the components downstream of the buses 24 and 40 are said to include "output sensors" for purposes of this application.

The components which include current sensors and switches may provide their current sensing by a current transformer. The transformers are typically proportional, and send a signal to a common control, shown as 100 in FIG. 1 which receives signals from all of these components, and can control all of the generators and associated engines. The proportional transformer may deliver a signal that is reduced relative to the sensed signal such that the ratio of the actual current to the current signal is 1,000:1.

Figure 2:
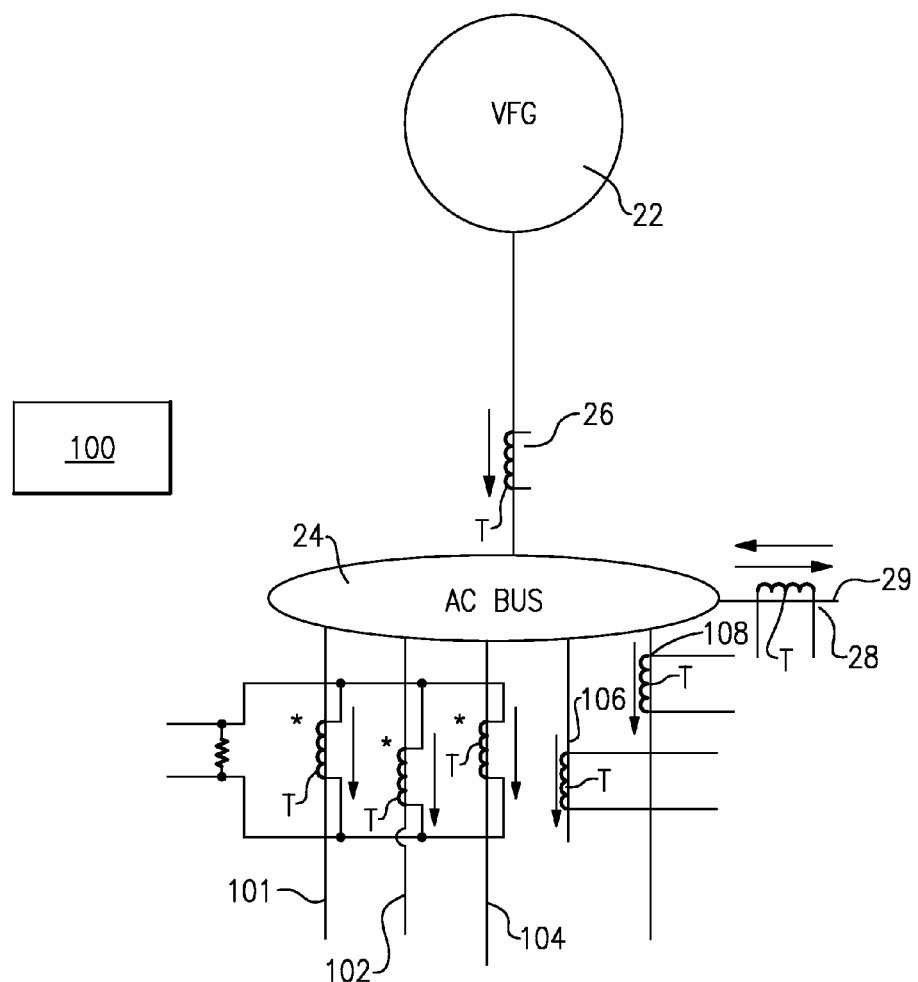
FIG. 2 shows a first sub-architecture associated with one generator.

As shown in FIG. 2, the "sub-architecture" associated with the variable frequency generator 22 includes users 101, 102, 104, 106 and 108. Further, the component 28 is shown on the tie bus 29. A transformer T is associated with each of the users 26, 28, 101, 102, 104, 106 and 108. It should be understood that switches are also included, although they are not illustrated in this Figure. The control 100 receives an input or supply current signal from the component 26. It also sums output signals from transformers T on lines communicating to users 101, 102, 104, 106, 108 and 28. The sum of those signals should be approximately equal to the current sensed at 26. If there is a difference between the two that exceeds a predetermined amount, then a fault can be detected. One example predetermined amount may be 100 amps, although this is simply an example.

If a fault is detected, the AC bus will be isolated, and several corrective steps may be taken. First, the switch in component 28 may be opened such that the fault will not pass across the tie bus 29. Second, the generator line switch, part of component 26, may be opened. Further, a voltage regulator associated with the generator 22, and internal switches, may all be opened so that the generator itself is stopped.

In this way, power may flow from the other generator across the entire system architecture, without being forced to encounter the fault. DC buses 94 and 92 are associated with AC buses 24 and 40. In FIG. 1, the DC bus 94 may be one of the "users." A DC tie bus 90 connects the buses 94 and 92 such that power can pass between the two sub-architectures illustrated in FIG. 1 in the event that one of the two is disabled.

Of course, the faults may be corrected after a very brief period of time, and normal operation restored at that point.

Figure 3A:
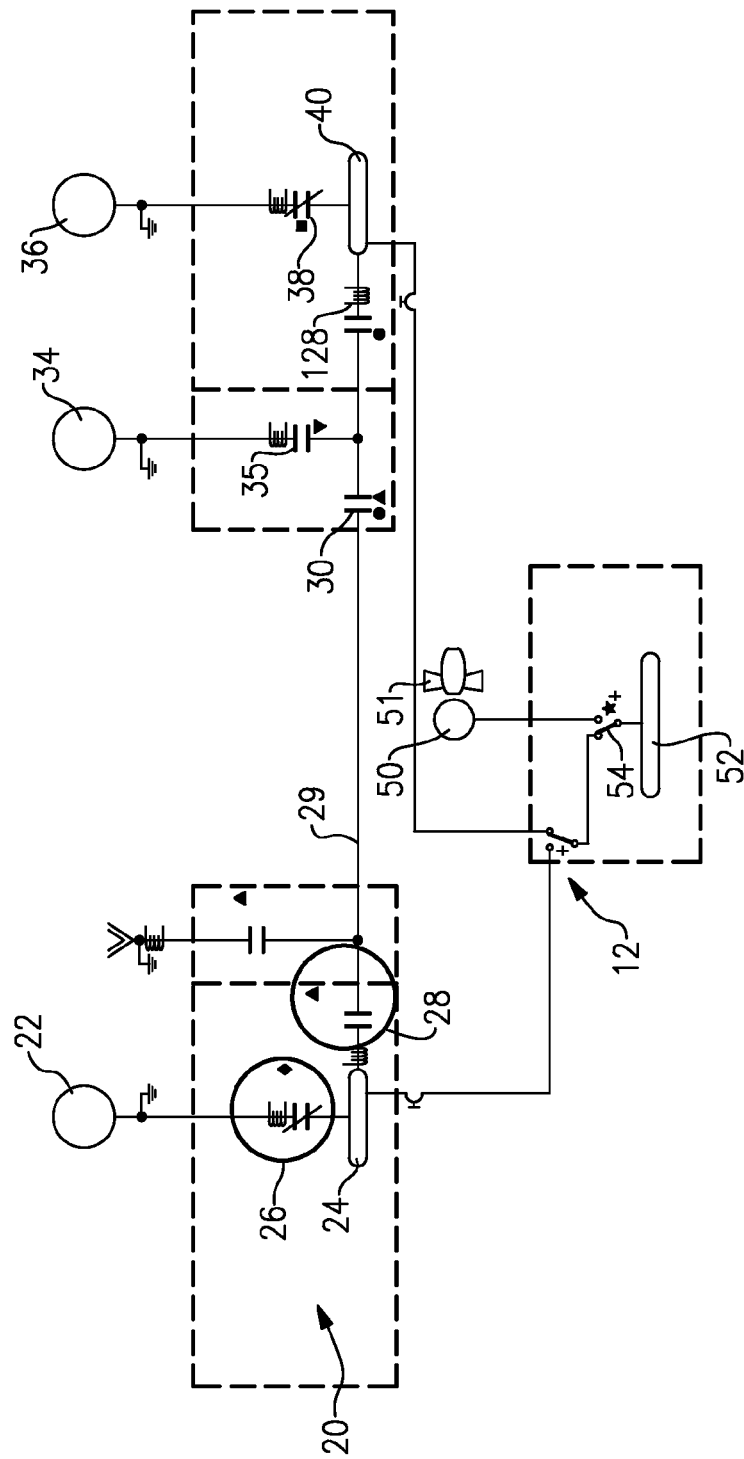
FIG. 3A shows a portion of the FIG. 1 architecture in a first condition.

FIG. 3A shows a fault detected on the first sub-architecture. The components 26 and 28 are opened. The switch 12, as shown in FIG. 1, communicates second architecture AC bus 40 with an AC essential bus 52 through the switch 54. Thus, in the event the fault is detected on the first sub-architecture, the switch 12 is moved such that power for the AC essential bus 52 is received from the second sub-architecture or generator 36. Notably, the switch 12 operates in combination with the switch 54 such that either of the two AC buses can be disconnected from the AC essential bus 52 in the event of a fault. The generator 50 can also be connected if both buses fail.

Figure 3B:
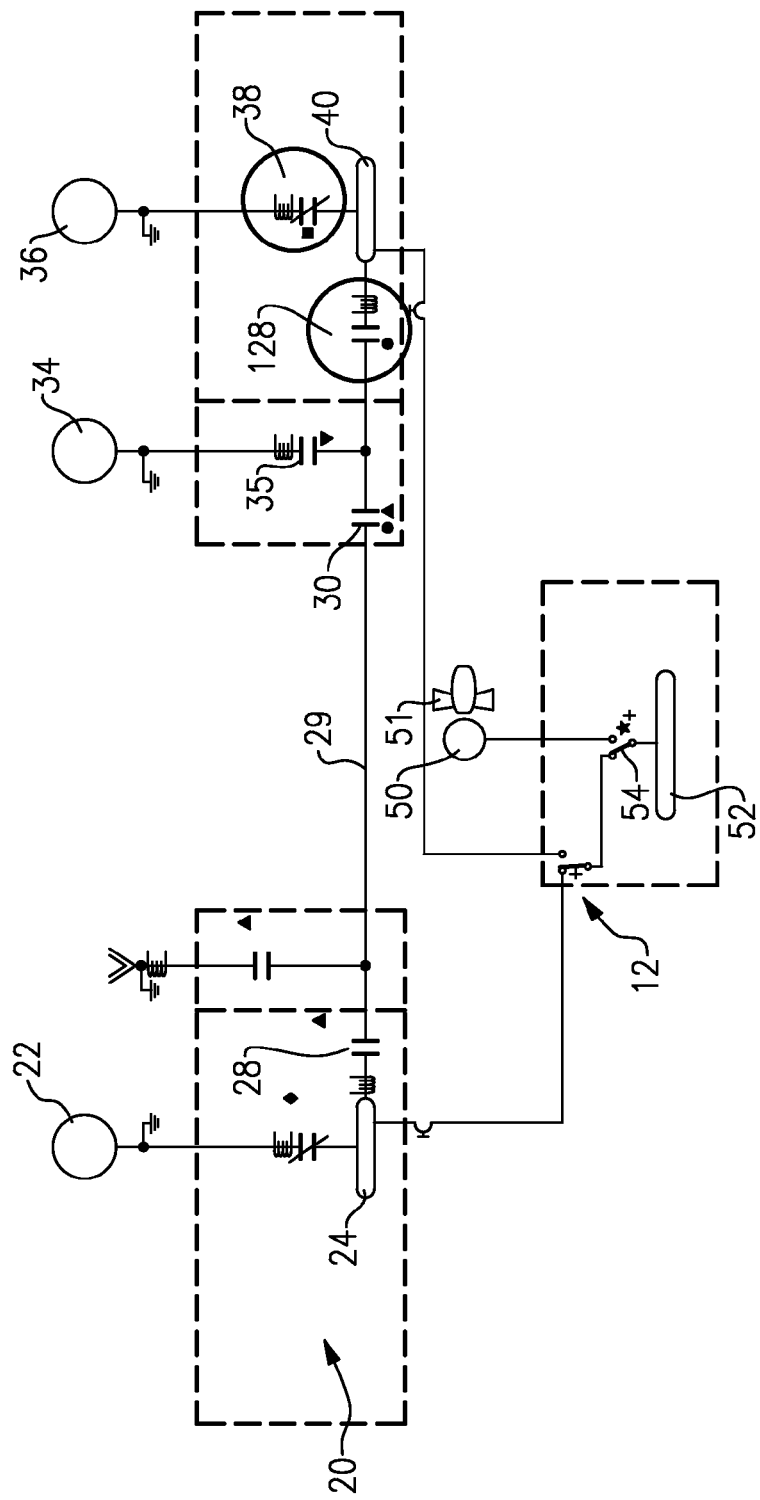
FIG. 3B shows a second condition.

FIG. 3B shows yet another example fault that may occur. In FIG. 3B, there is a fault on the second sub-architecture, and in particular on the AC bus 40. The component 128 has its switch open to isolate the fault at bus 40 from affecting operation. In addition, the switch 38 is opened, and the generator 36 is stopped. In this manner, the power from the generator 34 and the generator 32 can still be utilized and communicated through the tie bus 39. The switch 12 is switched such that the power from the generator 36 and the second sub-architecture are not utilized by the essential AC bus 52.

The present invention thus defines a very reliable and fast-acting way of identifying and reacting to faults in a complex electrical system architecture.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An electrical system architecture comprising:
at least two sources of electric power, each of said at least two sources delivering power to an individual AC bus, and said individual AC buses being connected by a tie bus;
a first of said sources of power delivering power into a first said individual AC bus, and said first AC bus for delivering power to a first set of users and a supply current sensor between said first source of power and said first AC bus, a tie bus output current sensor for sensing output current from said first AC bus being delivered onto said tie bus, and a plurality of user output current sensors, with said plurality of user output current sensors sensing current passing to each of said first set of users; and
a control operable to compare a sensed current in said supply current sense, and sum the sensed output currents in said tie bus output current sensor, and said plurality of user output current sensors, and if the sum differs by more than a predetermined amount from the sensed current from said supply current sensor, a fault is identified, and said first AC bus being disconnected from said tie bus.

2. The architecture as set forth in claim 1, wherein if a fault is identified on said first AC bus, then a switch is opened between said first source of power and said first AC bus along with opening a switch to disconnect said first AC bus from said tie bus.

3. The architecture as set forth in claim 2, wherein said first source of power is also stopped if a fault is identified on said first AC bus.

4. The architecture as set forth in claim 1, wherein a second of said at least two sources of power is also controlled by said control, said second of said sources of power delivering power into a second said individual AC bus, and said second AC bus for delivering power to a second set of users, and a second supply current sensor between said second source of power and said second AC bus, a second tie bus output current sensor for sensing output current from said second AC bus being delivered onto said tie bus, and a second plurality of user output current sensors, with said plurality of user output current sensors sensing current passing to each of said second set of users, said control operable to compare a sensed current in said second supply current sensor, and sum the sensed output currents in said second tie bus output current sensor, and said second plurality of user current sensors, and if the sum differs by more than a predetermined amount from the sensed current from said second supply current sensor, identifying a fault, and said second AC bus being disconnected from said second tie bus.

5. The architecture as set forth in claim 4, wherein if a fault is identified on said second AC bus, then a switch is opened between said second source of power and said second AC bus along with opening a switch to disconnect said second AC bus from said tie bus.

6. The architecture as set forth in claim 4 wherein said second source of power is also stopped if a fault is determined on said second AC bus.

7. The architecture as set forth in claim 4, wherein said first and second sources of power are gas turbine engines powering variable frequency generators.

8. The architecture as set forth in claim 4, wherein said tie bus also receives power from a third source of power, and there being switches on said tie bus such that said third source of power can be isolated on said tie bus from either of said first and second AC buses.

9. The architecture as set forth in claim 4, wherein said current sensors are all transformers.

10. The architecture as set forth in claim 9, wherein said transformers send a sensed current signal which is proportional to the actual sensed current.

11. The architecture as set forth in claim 4, wherein said each of said first and second AC buses communicate with an essential bus, and a switch disconnecting either of said first and second sources of power from said essential AC bus if a fault is identified on said either of said first and second AC buses.

12. The architecture as set forth in claim 11, wherein said switch for disconnecting either of said first and second AC buses from said essential AC bus is in series with another switch which selectively disconnects both of said first and second AC buses from said essential bus, and connects an emergency generator to said essential AC bus.

13. The architecture as set forth in claim 12, wherein said emergency generator is a ram air turbine.

14. The architecture as set forth in claim 1, wherein said current sensors are all transformers.

15. The architecture as set forth in claim 14, wherein said transformers send a sensed current signal which is proportional to the actual sensed current.

16. An electrical system architecture comprising:

at least two sources of electrical power, each of said at least two sources delivering power to an individual AC bus, and said individual AC buses being connected by a tie bus, a first of said sources of power delivering power into a first said individual AC bus, and said first AC bus for delivering power to a first set of users, and a first supply current sensor between said first source of power and said first AC bus, a first tie bus output current sensor for sensing output current from said first AC bus being delivered onto said tie bus, and a first plurality of user output current sensors, with said first plurality of user output current sensors sensing current passing to each of said first set of users;

a control operable to compare a sensed current in said first supply current sense, and sum the sensed output currents in said first tie bus output current sensor, and said first plurality of user output current sensors, and if the sum differs by more than a predetermined amount from the sensed current by said first supply current sensor, identifying a fault, and said first AC bus being disconnected from said tie bus;

a second of said sources of power delivering power into a second said individual AC bus, and said second AC bus delivering power to a second set of users, and a second supply current sensor between said second source of power and said second AC bus, a second tie bus output current sensor for sensing output current from said second AC bus being delivered onto said tie bus, and a second plurality of user output current sensors, with said second plurality of user output current sensors sensing current passing to each of said second set of users;

a control operable to compare a sensed current in said second supply current sense, and sum the sensed output currents in said second tie bus output current sensor, and said second plurality of user current sensors, and if the sum differs by more than a predetermined amount from the sensed current by said second supply current sensor, identify a fault, and said second AC bus being disconnected from said tie bus;

and if a fault is identified in either of said first or second AC buses, then a switch being opened between said either of said first and second sources of power and said first or second AC bus;

said first and second sources of power being gas turbine engines powering variable frequency generators;

said tie bus also receiving power from a third source of power, and there being switches on said tie bus such that said third source of power can be isolated on said tie bus;

said current sensors being transformers and said transformers sending a sensed current signal which is proportional to the actual sensed current; and each of said first and second AC buses communicating with an essential bus, and a switch disconnecting either of said first and second AC buses from said essential AC bus if a fault is identified in said either of said first and second AC buses.

17. The architecture as set forth in claim 16, wherein said switch for disconnecting either of said first and second AC buses from said essential AC bus is in series with another switch which selectively disconnects both of said first and second AC buses from said essential bus, and connects an emergency generator to said essential AC bus.

18. The architecture as set forth in claim 17, wherein said emergency generator is a ram air turbine.

* * * * *